No. 772,351. PATENTED OCT. 18, 1904.
F. X. GARTLAND.
DETACHABLE FASTENING APPLIANCE.
APPLICATION FILED JULY 23, 1903.
NO MODEL.
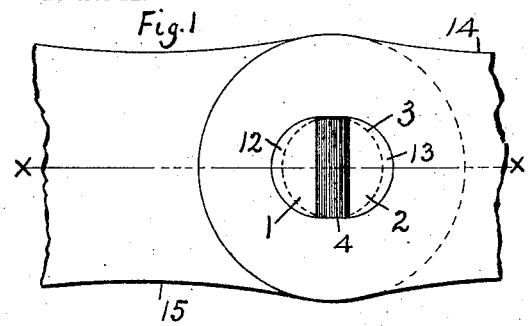
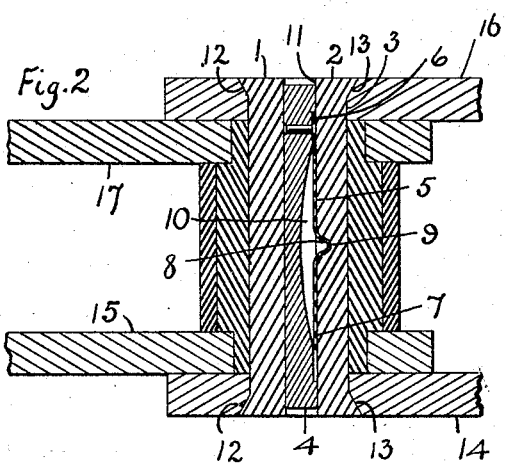
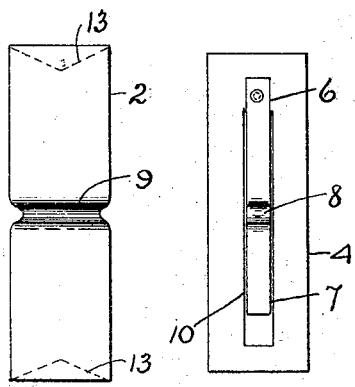
Witnesses.
Edward Wilde
W. MacDonald
Inventor
FRANCIS X. GARTLAND
By R.C. Wright
Atty.

No. 772,351. Patented October 18, 1904.

UNITED STATES PATENT OFFICE.

FRANCIS X. GARTLAND, OF PHILADELPHIA, PENNSYLVANIA.

DETACHABLE FASTENING APPLIANCE.

SPECIFICATION forming part of Letters Patent No. 772,351, dated October 18, 1904.

Application filed July 23, 1903. Serial No. 166,690. (No model.)

*To all whom it may concern:*

Be it known that I, FRANCIS X. GARTLAND, a citizen of the United States, residing at Philadelphia, in the county of Philadelphia and State of Pennsylvania, have invented certain new and useful Improvements in Detachable Fastening Appliances, of which the following is a specification.

This invention relates to appliances or detachable tripartite connections for constructions which require fastenings which can be readily removed, as automobile, bicycle, conveyer, and similar metallic chains or belts, as well as many machines and other places where it may be employed and where it is necessary or desirable to use a readily-removable connection or fastening which while perfectly safe from accidental removal or displacement does not project beyond the objects it secures and where bolt and pin heads, nuts, split pins, cotters, and keys are objectionable or their use is inadmissible owing to the amount of space necessary for their clearance in limited spaces or where any projecting object is dangerous.

The accompanying drawings, wherein the appliance is shown as applied to a chain or belt, will illustrate its application thereto and also convey an idea of its adaptability for other purposes, and wherein like parts are designated by similar reference characters, in which—

Figure 1 is a side view of the flush end or non-projecting form. Fig. 2 is a section on line $x$ $x$, Fig. 1. Fig. 3 is a detached view of the side part which receives the spring. Fig. 4 is a detached view of the central part.

The appliance comprises two side parts 1 2 of segmental cross-section, which are passed into a circular opening 3 and held to the sides of the opening by the central zone sectioned part 4, which is forced between them. Part 4 has a spring 5 secured thereto at its end 6 and free at its opposite end 7. Midway of the spring's length it is formed with a projection 8, which fits into a recess 9 in part 2. Part 4 has an elongated circular pocket 10, into which spring 5 bends to permit its projection 8 to freely pass under surface 11 when part 4 is introduced into the space between parts 1 2 or removed therefrom by end pressure, when the projection will leave pocket 9 and spring 5 will curve into pocket 10. To prevent the end movement or displacement of parts 1 2, they have at each end countersunk crescent-shaped flanges 12 13, flush with the parts in which they are inserted, as 14 15 16 17, and which they connect and hold.

I claim—

1. A detachable fastening appliance having side members, one of which has a recess or pocket and a central member, having resilient means adapted to enter said recess or pocket to permit the insertion of the central member and secure its retention subject only to end pressure or force.

2. A detachable fastening appliance comprising side members with crescent-shaped end flanges, and a central member adapted for insertion between the side members and having resilient means for its detachable retention.

In testimony whereof I affix my signature in presence of two witnesses.

FRANCIS X. GARTLAND.

Witnesses:
R. C. WRIGHT,
WILLIAM C. STOEVER.